(12) United States Patent
Sartori et al.

(10) Patent No.: US 9,398,438 B2
(45) Date of Patent: Jul. 19, 2016

(54) SYSTEM AND METHOD FOR TDD CONFIGURATION FOR D2D OPEN DISCOVERY

(71) Applicant: FutureWei Technologies, Inc., Plano, TX (US)

(72) Inventors: Philippe Sartori, Plainfield, IL (US); Vipul Desai, Palatine, IL (US); Mazin Al-Shalash, Frisco, TX (US); Weimin Xiao, Hoffman Estates, IL (US); Anthony C. K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 78 days.

(21) Appl. No.: 14/198,341

(22) Filed: Mar. 5, 2014

(65) Prior Publication Data

US 2014/0334354 A1    Nov. 13, 2014

Related U.S. Application Data

(60) Provisional application No. 61/822,124, filed on May 10, 2013.

(51) Int. Cl.
*H04W 8/00* (2009.01)
*H04L 5/00* (2006.01)
(Continued)

(52) U.S. Cl.
CPC ............ *H04W 8/005* (2013.01); *H04L 5/0051* (2013.01); *H04L 5/0094* (2013.01); *H04L 5/1469* (2013.01); *H04W 72/0446* (2013.01); *H04L 5/0007* (2013.01); *H04L 5/0073* (2013.01)

(58) Field of Classification Search
None
See application file for complete search history.

(56) References Cited

U.S. PATENT DOCUMENTS

| 2010/0103991 A1 | 4/2010 | Hart et al. |
| 2013/0142268 A1 | 6/2013 | Gao et al. |

(Continued)

FOREIGN PATENT DOCUMENTS

| CN | 102857901 A | 1/2013 |
| JP | 2010063122 A | 3/2010 |

(Continued)

OTHER PUBLICATIONS

"3rd Generation Partnership Project; Technical Specification Group Radio Access Network; Evolved Universal Terrestrial Radio Access (E-UTRA); Physical channels and modulation (Release 11)," 3GPP TS 36.211 v11.4.0, Sep. 2013, 120 pages.

(Continued)

*Primary Examiner* — Diane Lo
(74) *Attorney, Agent, or Firm* — Slater Matsil, LLP

(57) ABSTRACT

Embodiments are provided to support device-to-device (D2D) communications in a time-division duplexing (TDD) communications system, and ensure that D2D discovery signals are transmitted by user devices on an uplink subframe when there is a TDD frame configuration change. In an embodiment, a user device receives form the network a TDD frame configuration selected from a set of available TDD frame configurations according to the TDD configuration. The device further receives a D2D discovery configuration for a discovery time interval. The user device then allocates a transmission resource a D2D discovery signal within the discovery time interval according to the D2D discovery configuration. The user device is also configured to receive from another device a second D2D discovery signal during the discovery time interval in accordance with the TDD configuration and the D2D discovery configuration.

32 Claims, 4 Drawing Sheets

(51) Int. Cl.
*H04L 5/14* (2006.01)
*H04W 72/04* (2009.01)

(56) References Cited

U.S. PATENT DOCUMENTS

| | | | | |
|---|---|---|---|---|
| 2013/0188546 A1* | 7/2013 | Turtinen et al. | ................ | 370/312 |
| 2013/0223398 A1* | 8/2013 | Li et al. | .......................... | 370/329 |
| 2014/0242963 A1* | 8/2014 | Novlan | ................. | H04W 48/16 455/418 |

FOREIGN PATENT DOCUMENTS

| | | |
|---|---|---|
| KR | 20050055160 A | 6/2005 |
| WO | 2012019348 A1 | 2/2012 |

OTHER PUBLICATIONS

"3rd Generation Partnership Project; Technical Specification Group Services and System Aspects; Feasibility study for Proximity Services (ProSe) (Release 12)," 3GPP TR 22.803 v12.2.0, Jun. 2013, 45 pages.

Huawei Technologies Co., Ltd. et al., "Signaling Mechanisms for TDD eIMTA," #3GPP TSG RAN WGI Meeting #72bis, R1-130883, Apr. 19, 2013, 5 pages.

International Search Report Received in PCT/CN2014/077113, mailed Aug. 20, 2014, 8 pages.

InterDigital, "Recommendations for D2D Evaluation Methodology and Assumptions," 3GPP TSG-RAN WGI Meeting #72, R1-130236, Jan. 28-Feb. 1, 2013, downloaded by EPO on Jan. 19, 2013, 5 pages.

* cited by examiner

SYSTEM AND METHOD FOR TDD CONFIGURATION FOR D2D OPEN DISCOVERY

This application claims the benefit of U.S. Provisional Application No. 61/822,124 filed on May 10, 2013 by Philippe Sartori et al. and entitled "System and Method for TDD Configuration for D2D Open Discovery," which is hereby incorporated herein by reference as if reproduced in its entirety.

TECHNICAL FIELD

The present invention relates to the field of network communications, and, in particular embodiments, to a system and method for time-division duplexing (TDD) configuration for device-to-device (D2D) open discovery.

BACKGROUND

Device-to-Device (D2D) technology is getting attraction because of the ability to offer new services, improve system throughput, and offer a better user experience. Potential use cases for D2D have been identified by the 3GPP Service and System Aspects working group 1 (3GPP SA WG1) in the 3GPP Technical Report (TR) 22.803. However, in order for D2D to be successful and applicable to various deployment scenarios, there is need to ensure that D2D works for both time-division duplexing (TDD) and frequency-division duplexing (FDD) systems.

SUMMARY OF THE INVENTION

In accordance with an embodiment, a method for device-to-device (D2D) discovery in time division duplexing (TDD) communications includes selecting, at a network component, a TDD frame configuration from a set of available TDD frame configurations, and sending, from the network component, an indicator of the TDD frame configuration to a plurality of devices. The method further includes determining a D2D discovery configuration for a discovery time interval according to the TDD frame configuration, and sending, from the network component to the plurality of devices, the D2D discovery configuration. The D2D discovery configuration includes parameters enabling the devices to determine transmission resources of D2D discovery signals and transmit the D2D discovery signals during the discovery time interval.

In accordance with another embodiment, a method for D2D discovery in time TDD communications includes receiving, at a user device, an indicator of a TDD frame configuration selected from a set of available TDD frame configurations, and further receiving a D2D discovery configuration for a discovery time interval in accordance with the TDD frame configuration. The user device allocates a transmissions resource to a D2D discovery signal within the discovery time interval according to the D2D discovery configuration. The D2D discovery signal is transmitted by the user device during the discovery time interval. The user device also receives from another user device a second D2D discovery signal during the discovery time interval according to the TDD configuration and the D2D discovery configuration.

In accordance with another embodiment, a network component for TDD communications includes at least one processor and a computer readable storage medium storing programming for execution by the at least one processor. The programming includes instructions to select a TDD frame configuration from a set of available TDD frame configurations, and send an indicator of the TDD frame configuration to a plurality of devices. The instructions further configure the network component to determine a D2D discovery configuration for a discovery time interval according to the TDD frame configuration, and send, to the plurality of devices, the D2D discovery configuration. The D2D discovery configuration includes parameters enabling the devices to determine transmission resources of D2D discovery signals and transmit the D2D discovery signals during the discovery time interval.

In accordance with yet another embodiment, a user device for device-to-device (D2D) and time division duplexing (TDD) communications includes at least one processor and a computer readable storage medium storing programming for execution by the at least one processor. The programming includes instructions to receive an indicator of a TDD frame configuration selected from a set of available TDD frame configurations, and receive a D2D discovery configuration for a discovery time interval in accordance with the TDD frame configuration. The user device is further configured to allocate a transmissions resource to a D2D discovery signal within the discovery time interval according to the D2D discovery configuration, and transmit the D2D discovery signal during the discovery time interval. The programming includes further instructions to receive, from another user device, a second D2D discovery signal during the discovery time interval according to the TDD configuration and the D2D discovery configuration.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise

DETAILED DESCRIPTION OF ILLUSTRATIVE EMBODIMENTS

Figure 1:
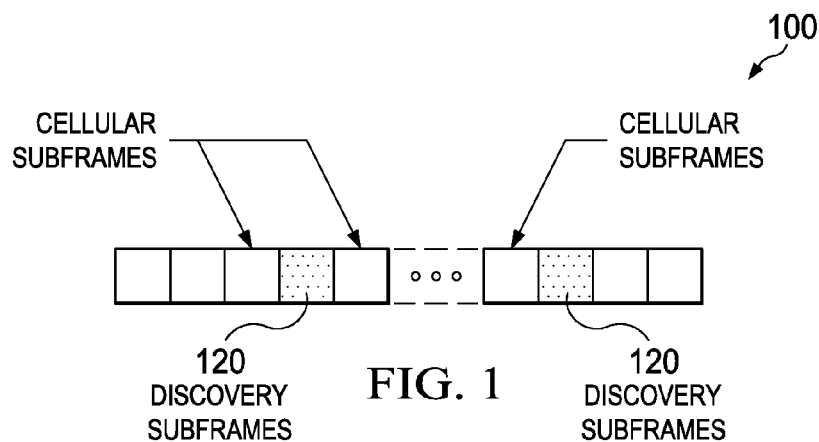
FIG. 1 illustrates an example of a discovery/cellular subframe partition.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One D2D technique is discovery. The discovery technique includes the ability for a user equipment (UE) to discover neighboring UEs and devices. A general description of discovery is that of one or more UEs transmitting D2D discovery signal(s) while one or more UEs attempt to receive those D2D discovery signal(s). The number of UEs transmitting, the number of UEs receiving, and the number/type of signals may vary in accordance with configuration/operation. For instance, discovery can be either network/base station-assisted or open discovery. With network/base station-assisted discovery, one UE is directed to transmit a signal (e.g., a Sounding Reference Signal (SRS) signal), and another UE is required to listen and report the signal quality to the base station, for example a communications controller/network device such as an evolved node B (eNB). The eNB can, based on this reported signal quality, decide if Proximity-based Services (ProSe) can be enabled for these two UEs. With open discovery, any UE can transmit a "beacon" signal to advertise its presence to other UEs. This process can possibly involve idle UEs (e.g., UEs in the idle state). Given that open discovery involves idle UEs, it is performed with limited available information. These UEs typically have to rely on the information broadcasted by the eNB, such as the system information block (SIB) or master information block (MIB). It would be relatively costly (in terms of power and network signaling) for most of the cases to wake up these UEs and transmit Radio Resource Control (RRC) or other higher layer signaling to them. Furthermore, the location of idle UEs is approximate, and the exact cell where they camp may not be known by the network.

Discovery transmissions may occur on the uplink (UL) portion of the bandwidth since the interference would be less prejudicial to cellular UEs on the UL than on the downlink (DL). In general, the bandwidth for the uplink can be different than the bandwidth for the downlink. In typical deployments, the bandwidths for the uplink and downlink are equal. On the UL, a transmission of a D2D discovery signal may interfere with the reception of cellular signals at the eNB. Consequently, as long as the D2D UE is at a reasonable distance from the eNB and/or transmitting with power restrictions, the interference created by the D2D discovery signal transmission has little impact. A D2D UE is a UE capable of transmitting D2D discovery signals as well as receiving D2D discovery signals. The D2D UE supports transmitting and receiving cellular signals. Conversely, on the DL, interference from D2D discovery signal transmissions can affect neighboring UEs and potentially disrupt/hinder their ability to receive synchronization channels and physical downlink control channels (PDCCHs), which can result in significantly higher impact than if the D2D UE is transmitting D2D discovery signals on the UL.

Embodiments are provided herein to ensure that D2D discovery signals are transmitted on an uplink subframe when there is a TDD frame configuration change, e.g., when a TDD frame configuration or reconfiguration is transmitted. A plurality of schemes herein consider that TDD frame configurations can change at higher frequency than changes to D2D discovery configuration. The embodiment schemes work for in-coverage UEs. Some of the embodiments also work for in-extended coverage UEs, e.g., when UEs are able to receive primary synchronization signals (PSS)/secondary synchronization signals (SSS), possibly after several transmissions.

Many cellular systems employ time division multiple access and use frames and subframes to mark transmissions opportunities. In one system, long term evolution (LTE), each subframe is 1 millisecond in duration and there are 10 subframes in each frame. The subframes are numbered 0 through 9. FIG. 1 shows an example of a discovery/cellular subframe partition 100 in a cellular or wireless network. The partition 100 reflects the frequency of discovery subframes versus cellular subframes. For open discovery, a given number of available subframes (e.g., about 1% of the subframes) can be reserved for discovery, while the remaining subframes are used as for cellular communications. During the discovery subframes, there usually are no cellular communications in the network. Only UE D2D discovery signals may be transmitted during the discovery subframes 120. Some D2D UEs may transmit D2D discovery signals while other D2D UEs may attempt to receive D2D discovery signals during the discovery subframe.

For TDD systems, there are several possible configurations for a radio frame in terms of UL/DL subframes as well as special subframes. For example, Table 1 below shows a set of possible TDD frame configurations for 3GPP Rel-11, which are also indicated in Table 4.2-2 of the 3GPP Technical Specification (TS) 36.211. In Table 1, "D" represents a DL subframe, "U" represents an UL subframe, and "S" represents a special subframe, which may comprise UL and DL portions (symbols).

TABLE 1

TDD uplink-downlink configurations.

| Uplink-Downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TDD frame reconfiguration can occur relatively often in a cellular or wireless network. For instance, in Rel-11 and earlier releases, the TDD reconfiguration is done by sending a new System Information Block 1 (SIB1) message. For Rel-12, in the context of the International Mobile Telecommunication Advanced (IMTA) work item, other faster TDD configuration mechanisms are discussed, e.g., as summarized in 3GPP RAN1 contribution R1-130883. The discussed options include RRC signaling, Physical broadcast channel (PBCH), Media Access Control (MAC) signaling, and Physical (PHY) layer signaling. Such reconfiguration options would not be received by idle UEs. Since the set of TDD frame configurations are known to both the eNB and the UEs, the eNB can transmit an indicator of a selected TDD frame configuration, such as an index between 0 and 6.

It is likely that the D2D discovery reconfiguration would not change/occur very frequently in the network. On the other hand, the TDD configuration can change relatively frequently, especially with the standardization of IMTA. The idle UEs may not be notified of these TDD configuration changes. Since it is preferable to have the D2D subframes on the UL, as described above, it is practical and desirable to have a mechanism which ensures that the D2D discovery subframes remain on the UL when TDD reconfiguration occurs. Additionally, the mechanism may need to work properly for inter-cell D2D discovery, e.g., in the case of a synchronized network.

A plurality of embodiment schemes are provided herein to ensure that the D2D discovery subframes are transmitted on the UL. In an embodiment scheme, the transmission of a D2D discovery is restricted to subframe 2 for TDD UL/DL configurations, as shown in Table 1 (or Table 4.2-2 of 3GPP TS 36.211). When looking at Table 1, it can be seen that subframe 2 is always UL, regardless of the TDD frame configuration. The network or base station, e.g., an eNB, can use a rule that the discovery subframe is always transmitted on subframe 2. As such, the UE does not need to know the TDD frame configuration. One implication is that the discovery subframe interval is a multiple of 10 millisecond (ms). This scheme provides a compact way to signal which subframes are discovery subframes, which can reduce the frequency of transmitting D2D discovery configuration for idle UEs that need to get this message while powering on. In another rule, a compact way to signal where the discovery subframes are located is to send the following: an initial radio frame index r, and a spacing index i. The receiving UE interprets this message as follows: the first discovery subframe is subframe 2 in radio frame r, the next is subframe 2 in radio frame r+i, then subframe 2 in radio frame r+2i, and so forth. The addition is modulo. For instance, in LTE, the frames are numbered 0 to 1023. If the value of (r+ki) exceeds 1023 for some integer k, the frame is (r+ki) modulo 1024. This approach may impose certain restrictions on both discovery and cellular operations, considering UL subframes may be used for other applications.

Other embodiment schemes include alternatives to place the discovery subframes at desired transmission locations. For instance, the network may locate the discovery subframe on other subframes than subframe 2. This can be achieved by noticing that in Table 1, except for TDD frame configurations 2 and 5, all the other configurations have subframe 3 as UL. Thus, another way to achieve the goal of having discovery subframes on the UL is to prohibit the use of TDD frame configurations 2 and 5 in a radio frame where D2D discovery transmission occurs and to always use subframe 3 for transmitting the D2D discovery signal during the discovery subframe. In another example, another alternative embodiment comprises using subframe 7 as discovery subframe and preventing the use of TDD frame configurations 3, 4, and 5.

The embodiment further comprises a scheme in which RRC-connected mode UEs can be assigned a second set of discovery subframe locations. The set can be signaled to idle UEs as well. The network can instruct UEs to always listen for D2D discovery signals in the second set. In an alternative approach, each UE uses a pseudo-random binary sequence generator to decide whether it is going to listen to discovery messages potentially transmitted in the second set. The probability rule associated to the pseudo-random binary generator can be signaled by the network. Assigning such a set may help in faster discovery of the information conveyed in the D2D discovery signals transmitted by RRC-connected UEs. The RRC-connected UEs may be aware of the actual TDD frame configuration and therefore, they can transmit for instance in subframe 3 if they have been instructed to do so and if subframe 3 is an UL subframe in the present TDD frame configuration. The RRC-connected UEs that are not transmitting D2D discovery signals may listen to D2D discovery signals transmitted by other RRC-connected UEs in such subframes.

In yet other embodiments, a similar scheme can be used on the DL instead of UL. For instance, by noting that subframe 5 is always DL, subframe 5 can be used for D2D discovery no matter the TDD frame configuration. Assuming that the UEs decode SIB1, and that the TDD frame configuration is always indicated by SIB1, other rules can also be implemented. For instance, the D2D discovery subframe can have priority over the DL cellular subframe. Another rule can be the discovery subframe is restricted to odd numbered frames (1, 3, . . . ) since SIB1 is transmitted from the eNB on subframe 5 every even numbered frame.

In another embodiment, the uplink pilot timeslot (UpPTS) portion of a special subframe can be used for D2D discovery. When looking at Table 1, subframe 1 is a special subframe among the configurations. A special subframe contains a downlink portion, e.g., a downlink pilot timeslot (DwPTS), some guard time, and an uplink pilot timeslot (UpPTS). There is a listing of special subframe configurations with various combinations of symbols for the DwPTS and UpPTS in Table 4.2-1 of 3GPP TS 36.211. The UpPTS portion of the subframe is short, and in practice, may not be useful for certain cellular transmissions, such as the Physical Uplink Shared Channel (PUSCH) transmission. In various deployments, the UpPTS section is unused for uplink signal transmission since it is only 1 to 2 symbols in length. Thus, the D2D discovery signal may be transmitted in the UpPTS section of the special subframe. Deploying this solution is similar to deploying the solution described above using the subframe 2 for D2D discovery. However, the solution using the UpPTS portion of the special subframe for D2D discovery may place some constraints on the D2D discovery signal design. For example, the D2D discovery signal may have to be transmitted on at most 1 symbol, since the minimum UpPTS length is 1 symbol. The random access channel (RACH) can be supported on the special subframe even when there is one uplink symbol for certain special subframe configurations. Because the RACH requires two symbols, the standard allows some guard time to be used for RACH transmission. The usage of guard time for certain special subframe configurations can be extended for the discovery, and thus allows the D2D discovery signal to be transmitted over two symbols. The duration of one symbol is approximately $\frac{1}{14}^{th}$ of a subframe for certain cyclic prefix configurations.

Another embodiment based on the special subframe is to reserve several symbols of DwPTS for discovery. As noted, subframe 1 is always a special subframe. Due to overhead transmitted by the eNB in the first 3 symbols of the DwPTS, the first 3 symbols of DwPTS may be inappropriate for discovery. Although several special subframe configurations have the DwPTS as 3 symbols, other configurations have longer durations, such as 6 symbols. The symbols that are not reserved for cellular transmissions in the DwPTS can be used for discovery. For example, special subframe configuration 1 (Table 4.2-1 of 36.211) has a DwPTS of 9 symbols. A part of the DwPTS, for instance the last 6 symbols (the symbols following the first 3 symbols of the DwPTS), can be reserved for discovery. Some portion of the DwPTS symbols reserved for discovery may be used for switching between transmit and receive modes. In another embodiment, subframe 6 is either a special subframe or a DL subframe. A similar usage of symbols after the first 3 symbols of the subframe can be used for discovery.

In another embodiment, a combination of the aforementioned discovery locations can be used. In particular, discovery resources may be available in UpPTS (1-2 symbols) and/or in DwPTS (for some special subframe configurations), and/or in other subframes (like subframe #2).

The embodiment further comprises having different discovery resource sizes corresponding to the location of D2D discovery signal. In an example, a discovery resource is 1RB in subframe 2 and 6 RBs in UpPTS (having a 2-symbol length). These resources can be located in same or different radio frames.

In another embodiment, the discovery subframes are allowed to be either UL or DL. One possible implementation is based on that for TDD, whether the subframe is DL or UL, the interference level in the cellular system is the same as long as only D2D discovery signals are transmitted. Consequently, it is possible to allow discovery to be performed either on an UL or DL subframe, as long as no cellular transmission occurs. Hence, at least in theory, doing nothing other than allowing discovery subframes to be either DL and UL is enough. While this solution may work, it may be in practice difficult to implement. Since there are more signals and channels transmitted on specific subframes of the DL (e.g., PBCH, SIBs), having DL D2D discovery subframes may result in these subframes colliding with the subframes where these DL channels are transmitted. This could cause some backwards probability problems. Furthermore, the UE needs to perform channel measurements on the DL. If the UE happens to perform channel measurements on a discovery subframe, the measurements may be incorrect. Consequently, while possible, this solution may not be a preferred solution to have DL discovery subframes.

In another embodiment, a subframe configured as a Multicast-Broadcast Single Frequency Network (MBSFN) subframe is used for signaling the D2D discovery on the DL. For instance, subframes 0 or 5 in Table 1 can be used, since these subframes are always DL subframes. One solution is to periodically configure a DL subframe as a MBSFN subframe. All the UEs need to know when this subframe occurs (e.g., by specification, by having its location broadcasted, and by any other suitable means). The periodically scheduled MBSFN subframe is reserved for D2D discovery. Since this is an MBSFN subframe, it can be empty, except for the cell-specific reference signal (CRS) in symbol 0, and possibly 1 if 4 CRS ports are used, of the subframe, if the eNB does not send any grants in the PDCCH region (e.g., first few symbols of the subframe) for this subframe and if no Semi-Persistent Scheduling (SPS) transmission is scheduled. The D2D UEs can transmit their D2D discovery signals in one of these scheduled subframes. With some guard time, it is possible to have the D2D discovery signal sent in the empty or blank part of the MBSFN subframe. It may also be possible to send the D2D discovery signal at the same time as the CRS on symbol 0 of the MBSFN subframe, although this would create some interference, e.g., for the receiving UEs close to the eNB. The CRS interference impact may be more in case of having a cluster of small cells. However, the cellular UEs are not affected by this increase in interference. The scheme may also suffer from additional discovery performance degradation in the presence of a transmission power hopping mechanism allowing a UE to transmit its D2D discovery signal with a smaller power than its maximum transmit power.

In another embodiment, a new D2D discovery configuration is broadcasted every time a new TDD frame configuration is selected. The new D2D discovery configuration broadcast message can occur on the PBCH, which conveys the MIB, or a SIB message. While relatively easy, this solution may have drawbacks. The TDD frame configuration may change quite often, since it adapts to the instantaneous traffic demand. On the other hand, the D2D discovery configuration may not need to change that often since it adapts to the density of present users, which may more stable than the traffic demand. In idle mode, a UE may not listen very often to the control channels (e.g., PBCH, PDCCH). In order not to miss any message, an idle UE would have to listen more often, resulting in increased power consumption. In addition, the D2D discovery configuration needs to be sent out quite often, resulting in high overhead for the system.

In another embodiment, a new D2D discovery configuration is broadcasted every time the TDD frame configuration is broadcasted, as in the solution above. An additional step is implemented. The UE knows where UL subframes are located. However, according to the broadcasted D2D discovery configuration, the D2D discovery subframe may coincide with the UL subframes. Therefore, an additional rule is that when the D2D discovery subframe does not coincide with the UL subframe, the UE selects the closest UL subframe for the D2D discovery subframe. The closest UL subframe may be the first UL subframe after where the D2D subframe should be, or before, or any similar criterion. The closest UL subframe can mean: the first UL subframe after where the discovery subframe should be, or before, or any similar criterion.

Figure 2:
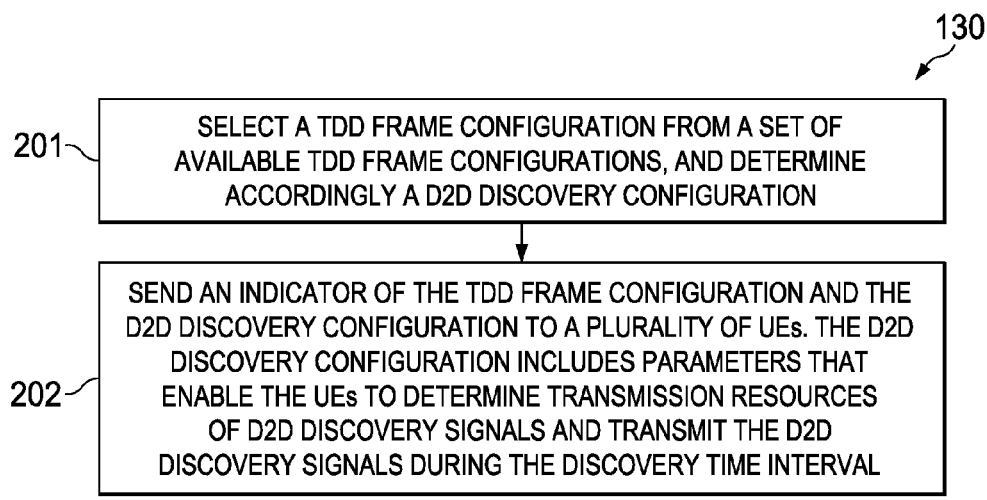
FIG. 2 illustrates a base station or network operation according to an embodiment of the disclosure.

FIG. 2 illustrates a base station or network operation 130 for configuring D2D discovery at a plurality of UEs. At step 201, the base station or network component selects a TDD frame configuration from a set of available TDD frame configurations. The base station further determines a suitable D2D discovery configuration according to the TDD frame configuration, for instance to ensure that D2D discovery signals are transmitted on an uplink subframe when there is a TDD frame configuration change. At step 202, the base station or network component sends an indicator of the TDD frame configuration and the D2D discovery configuration to a plurality of UEs. The D2D discovery configuration includes parameters that enable the UEs to determine transmission resources of D2D discovery signals and transmit the D2D discovery signals during the discovery time interval.

Figure 3:
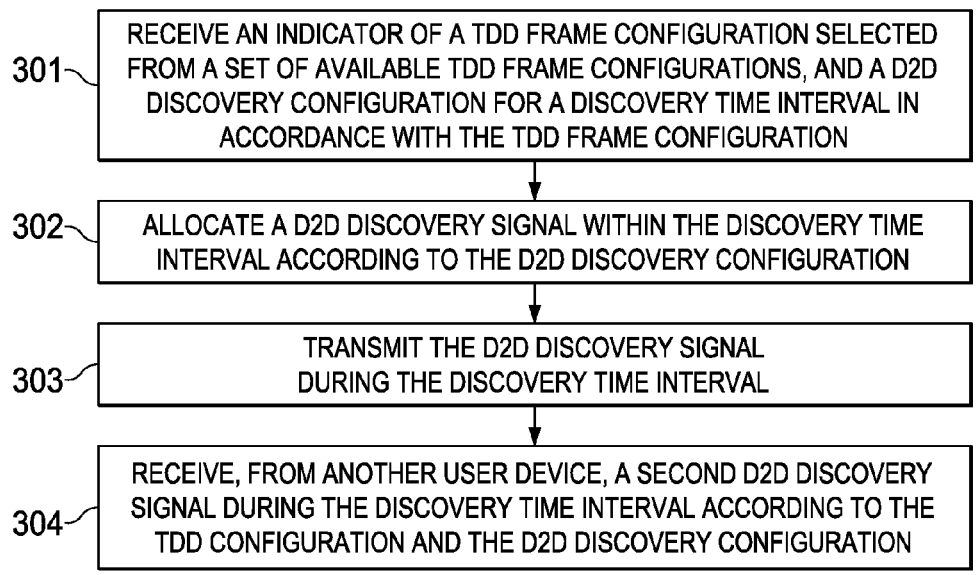
FIG. 3 illustrates a user equipment (UE) operation according to an embodiment of the disclosure.

FIG. 3 illustrates a UE operation 140 for handling transmissions of D2D discovery signals. At step 301, the UE receives, from a base station or the network, an indicator of a TDD frame configuration selected from a set of available TDD frame configurations, and a D2D discovery configuration for a discovery time interval in accordance with the TDD frame configuration. At step 302, the UE allocates a transmissions resource to a D2D discovery signal within the discovery time interval according to the D2D discovery configuration. At step 303, the UE transmits the D2D discovery signal during the discovery time interval. At step 304, the UE receives, from another user device, a second D2D discovery signal during the discovery time interval according to the TDD configuration and the D2D discovery configuration.

Figure 4:
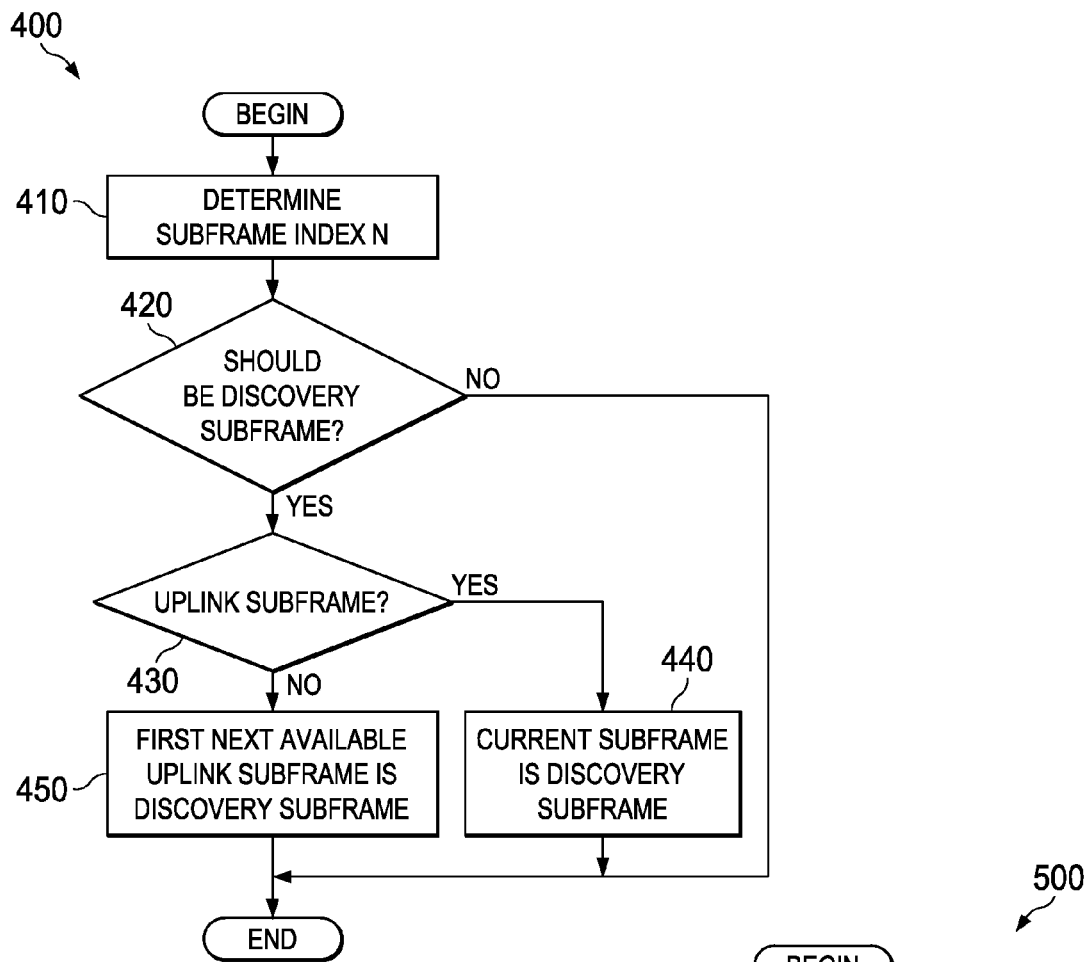
FIG. 4 illustrates a base station or UE operation according to an embodiment of the disclosure.

FIG. 4 shows a base station or UE operation method 400 for determining whether a subframe is a D2D discovery subframe. Note that having a predefined subframe can also apply to a FDD system (systems that support FDD and TDD), and would lead to a similar logic, with minor changes. The method 400 may be used in any suitable embodiment of the embodiments described above. In the case of a base station, e.g., an eNB, implementing the method 400, the eNB determines, in step 410, the current subframe number N (N is an integer). For example N can range from 0 to 9 for LTE Rel-11.

In step 420, the eNB determines if subframe N should be a subframe for D2D discovery signal transmission among UEs according to the D2D discovery configuration or the scheme adopted. One example is comparing the current frame number to the frame number when a discovery subframe is to be sent. If the result of the decision step 420 is yes, then the eNB determines, in step 430, if the current subframe N is an uplink subframe. Otherwise, the method 400 ends. If the result of the decision step 430 is yes, then, in step 440, the eNB assigns subframe N as a D2D discovery subframe. Otherwise, in step 450, the eNB configures the next uplink subframe following subframe N as a D2D discovery subframe. Note that this last step is optional, and may not be necessary for some embodiments.

In the case of a UE implementing the method 400, the UE, in step 410, determines the current subframe number N. In step 420, the UE determines if subframe N should be a subframe where the D2D discovery signal should be sent according to the D2D discovery configuration or the scheme adopted. If not, then the method 400 ends. If yes, then the UE determines, in step 430, if the current subframe N is an uplink subframe. If yes, then in step 440, the UE processes subframe N as a D2D discovery subframe. If not, then in step 450, the UE treats the next uplink subframe following subframe N as a discovery subframe. Note that this last step is optional, and may not be necessary for some embodiments.

Figure 5:
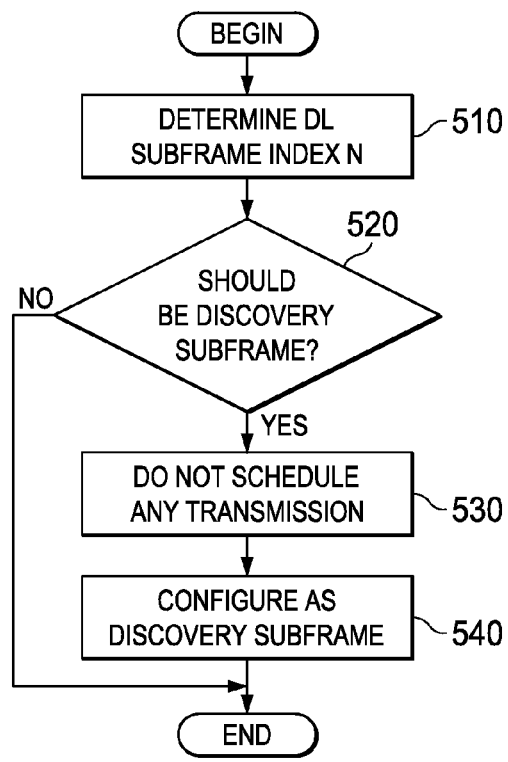
FIG. 5 illustrates a base station operation according to an embodiment of the disclosure.

FIG. 5 shows a base station operation method 500 that may be used in any suitable embodiment of the embodiments described above, for instance in the case of using the MBSFN subframe for D2D discovery. The method 500 implies that the base station, e.g., an eNB, has previously sent a D2D discovery configuration and a MBSFN configuration with no error, e.g., indicating that the D2D discovery subframe is always on a MBSFN subframe. If that is not the case, an operation similar to that in method 400 can also be implemented to determine where to locate the D2D discovery subframe. In step 510 of the method 500, the eNB determines the current DL subframe N. In step 520, the eNB determines if subframe N should be a subframe where the D2D discovery signal is sent according to the D2D discovery configuration or the scheme adopted. If not, then the method 500 ends. If yes, then in step 530, the eNB does not schedule any transmission during the subframe. In step 540, the eNB configures subframe N as D2D subframe.

Figure 6:
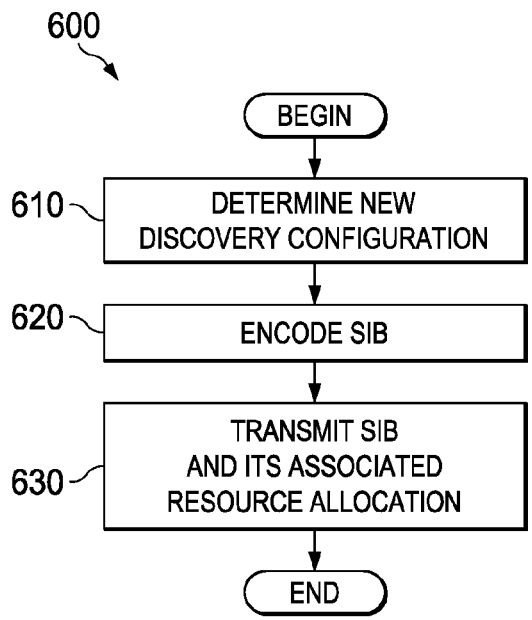
FIG. 6 illustrates a base station operation according to an embodiment of the disclosure.

FIG. 6 shows a base station operation method 600 that may be used in any suitable embodiment of the embodiments described above, for instance in the case of broadcasting (e.g., on a PBCH or SIB message) a new D2D discovery configuration every time a new TDD configuration is selected. In step 610, the base station, e.g., communications controller or eNB, decides to use a new D2D discovery configuration. In step 620, the eNB encodes a new SIB message accordingly. In step 630, the eNB transmits the new SIB as well as the resource allocation for transmitting this SIB.

Figure 7:
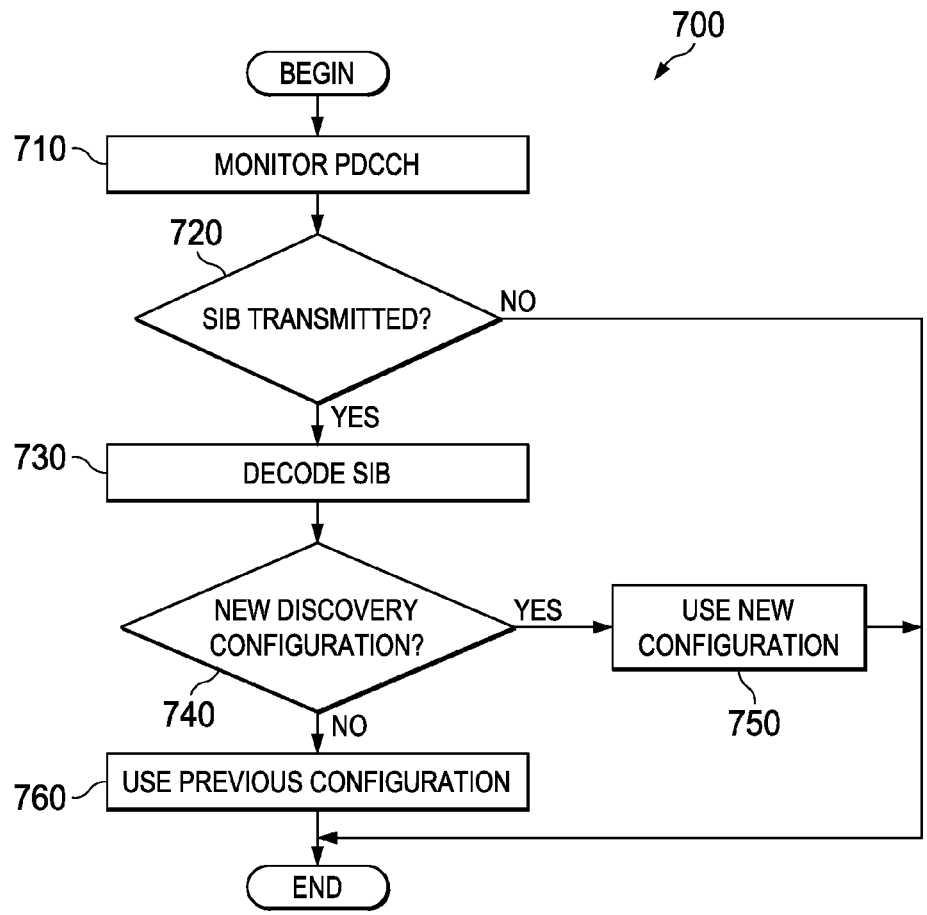
FIG. 7 illustrates a UE operation according to an embodiment of the disclosure.

FIG. 7 shows a UE operation method 700 that may be used corresponding to the operation method 600 of the base station, for instance in the case of broadcasting (e.g., on a PBCH or SIB message) a new D2D discovery configuration every time a new TDD configuration is selected. In step 710, the UE monitors the common PDCCH search space on some subframes to determine if the SIB containing the new discovery allocation is transmitted. If it is determined in step 720 that a SIB is transmitted, the UE decodes the SIB in step 730, and the method 700 proceeds to step 740. Otherwise, the method 700 ends. If it is determined in step 740 that the SIB includes a new D2D discovery configuration, the UE switches to the new discovery configuration in step 750. Otherwise, the UE continues to use the previous discovery configuration in step 760.

Figure 8:
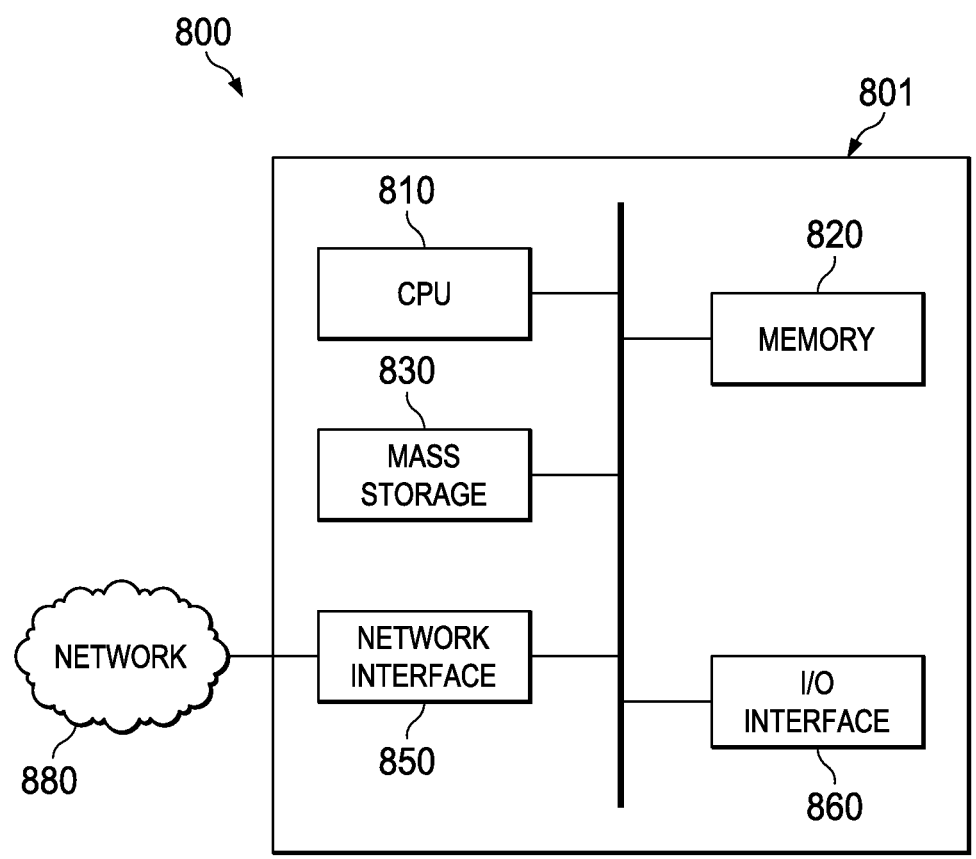
FIG. 8 is a diagram of a processing system that can be used to implement various embodiments.

FIG. 8 is a block diagram of an exemplary processing system 800 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a network interfaces, storage interfaces, and the like. The processing unit 801 may include a central processing unit (CPU) 810, a memory 820, a mass storage device 830, and an I/O interface 860 connected to a bus. The bus may be one or more of any type of several bus architectures including a memory bus or memory controller, a peripheral bus or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for device-to-device (D2D) discovery in time division duplexing (TDD) communications, the method comprising:
selecting, at a network component, a TDD frame configuration from a set of available TDD frame configurations;
sending, from the network component, an indicator of the TDD frame configuration to a plurality of devices;
determining a D2D discovery configuration for a discovery time interval according to the TDD frame configuration; and
sending, from the network component to the plurality of devices, the D2D discovery configuration,
wherein the D2D discovery configuration includes parameters relating to resources of D2D discovery signals and transmission of the D2D discovery signals during the discovery time interval, the D2D discovery configuration comprising an initial discovery configuration radio frame and a spacing index for locating subsequent discovery configuration radio frames, wherein the D2D discovery configuration indicates, to each of the plurality of devices, successive D2D discovery subframe indices in the discovery time interval according to:

$$j=(r+ki) \bmod 1024,$$

wherein j is a D2D discovery subframe index in the discovery time interval, r is the initial discovery configuration radio frame, i is the spacing index, and k is an integer offset, the integer offset being 1 for an initial D2D discovery subframe index and increasing by 1 for each one of the successive D2D discovery subframe indices.

2. The method of claim 1, wherein the discovery time interval corresponds to defined symbols in a designated subframe or multiple subframes of the set of available TDD frame configurations.

3. The method of claim 2, and wherein the set of available TDD configurations includes configurations 0 to 6,
wherein configuration 0 comprises corresponding subframes 0 and 5 on downlink bandwidth, subframes 1 and 6 defined as special subframes including an uplink bandwidth portion and a downlink bandwidth portion, and subframes 2, 3, 4, 7, 8, and 9 on uplink bandwidth,
wherein configuration 1 comprises corresponding subframes 0, 4, 5, and 9 on downlink bandwidth, subframes 1 and 6 defined as special subframes, and subframes 2, 3, 7, and 8 on uplink bandwidth,
wherein configuration 2 comprises corresponding subframes 0, 3, 4, 5, 8 and 9 on downlink bandwidth, subframes 1 and 6 defined as special subframes, and subframes 2, and 7 on uplink bandwidth,
wherein configuration 3 comprises corresponding subframes 0, 5, 6, 7, 8 and 9 on downlink bandwidth, subframe 1 defined as a special subframe, and subframes 2, 3, and 4 on uplink bandwidth,
wherein configuration 4 comprises corresponding subframes 0, 4, 5, 6, 7, 8 and 9 on downlink bandwidth, subframe 1 defined as a special subframe, and subframes 2, and 3 on uplink bandwidth,
wherein configuration 5 comprises corresponding subframes 0, 3, 4, 5, 6, 7, 8 and 9 on downlink bandwidth, subframe 1 defined as a special subframe, and subframe 2 on uplink bandwidth, and
wherein configuration 6 comprises corresponding subframes 0, 5, and 9 on downlink bandwidth, subframes 1 and 6 defined as special subframes, and subframes 2, 3, 4, 7 and 8 on uplink bandwidth.

4. The method of claim 3, wherein, according to the D2D discovery configuration, the transmissions of the D2D discovery signals are on the uplink bandwidth.

5. The method of claim 3, wherein, according to the D2D discovery configuration, the transmissions of the D2D discovery signals are on the downlink bandwidth.

6. The method of claim 5, wherein the designated subframe is a common subframe on the downlink bandwidth for all configurations in the set of available TDD configurations.

7. The method of claim 5, wherein the designated subframe is subframe 5 in the set of available TDD configurations.

8. The method of claim 5, wherein the designated subframe is a Multicast-Broadcast Single Frequency Network (MBSFN) subframe.

9. The method of claim 3, wherein the designated subframe is a special subframe in the set of available TDD configurations, and comprising both an uplink bandwidth portion and a downlink bandwidth portion of symbols.

10. The method of claim 9, wherein the designated subframe is subframe 1 in the set of available TDD configurations.

11. A method for device-to-device (D2D) discovery in time division duplexing (TDD) communications, the method comprising:
receiving, at a user device, an indicator of a TDD frame configuration selected from a set of available TDD frame configurations;
receiving, at the user device, a D2D discovery configuration for a discovery time interval in accordance with the TDD frame configuration, the D2D discovery configuration comprising an initial discovery configuration radio frame and a spacing index for locating subsequent discovery configuration radio frames, wherein the D2D discovery configuration indicates, to the user device, successive D2D discovery subframe indices in the discovery time interval according to:

$$j=(r+ki) \bmod 1024,$$

wherein j is a D2D discovery subframe index in the discovery time interval, r is the initial discovery configuration radio frame, i is the spacing index, and k is an integer offset, the integer offset being 1 for an initial D2D discovery subframe index and increasing by 1 for each one of the successive D2D discovery subframe indices;
allocating a transmissions resource to a D2D discovery signal within the D2D discovery subframe indices in the discovery time interval according to the D2D discovery configuration;
transmitting, from the user device, the D2D discovery signal during the discovery time interval; and
receiving, at the user device from another user device, a second D2D discovery signal during the discovery time interval according to the TDD configuration and the D2D discovery configuration.

12. The method of claim 11 wherein, the indicator of the TDD frame configuration is received via higher layer signaling.

13. The method of claim 11, wherein the discovery time interval corresponds to allocated symbols in a designated subframe of multiple subframes of the set of available TDD frame configurations, and wherein the D2D discovery signal is transmitted only using the allocated symbols on the designated subframe.

14. The method of claim 13, and wherein the set of available TDD configurations includes configurations 0 to 6, wherein configuration 0 comprises corresponding subframes 0 and 5 on downlink bandwidth, subframes 1 and 6 defined as special subframes including an uplink bandwidth portion and a downlink bandwidth portion, and subframes 2, 3, 4, 7, 8, and 9 on uplink bandwidth,
wherein configuration 1 comprises corresponding subframes 0, 4, 5, and 9 on downlink bandwidth, subframes 1 and 6 defined as special subframes, and subframes 2, 3, 7, and 8 on uplink bandwidth,
wherein configuration 2 comprises corresponding subframes 0, 3, 4, 5, 8 and 9 on downlink bandwidth, subframes 1 and 6 defined as special subframes, and subframes 2, and 7 on uplink bandwidth,
wherein configuration 3 comprises corresponding subframes 0, 5, 6, 7, 8 and 9 on downlink bandwidth, subframe 1 defined as a special subframe, and subframes 2, 3, and 4 on uplink bandwidth,
wherein configuration 4 comprises corresponding subframes 0, 4, 5, 6, 7, 8 and 9 on downlink bandwidth, subframe 1 defined as a special subframe, and subframes 2, and 3 on uplink bandwidth,
wherein configuration 5 comprises corresponding subframes 0, 3, 4, 5, 6, 7, 8 and 9 on downlink bandwidth, subframe 1 defined as a special subframe, and subframe 2 on uplink bandwidth, and
wherein configuration 6 comprises corresponding subframes 0, 5, and 9 on downlink bandwidth, subframes 1 and 6 defined as special subframes, and subframes 2, 3, 4, 7 and 8 on uplink bandwidth.

15. The method for claim 14, wherein, in accordance with the D2D discovery configuration, the D2D discovery signal is transmitted only on the uplink bandwidth.

16. The method of claim 15, wherein the designated subframe is subframe 2 in the set of available TDD configurations.

17. The method of claim 15, wherein the designated subframe is subframe 3 in configurations 0, 1, 3, 4, and 6 in the set of available TDD configurations.

18. The method of claim 15, wherein the designated subframe is subframe 7 in configurations 0, 1, 2, and 6 in the set of available TDD configurations.

19. The method for claim 14, wherein, in accordance with the D2D discovery configuration, the D2D discovery signal is transmitted only on downlink bandwidth.

20. The method of claim 19, wherein the designated subframe is subframe 0 or 5 in the set of available TDD configurations.

21. The method of claim 19, wherein the designated subframe is a Multicast-Broadcast Single Frequency Network (MBSFN) subframe.

22. The method of claim 14, wherein the designated subframe is a special subframe.

23. The method of claim 22, wherein the special subframe comprises both an uplink portion and a downlink portion of symbols, and wherein the method further comprises detecting the D2D discovery signal on the uplink bandwidth portion of the special subframe in accordance with the D2D discovery configuration.

24. A network component for time division duplexing (TDD) communications, the network component comprising:
at least one processor; and
a non-transitory computer readable storage medium coupled to the at least one processor storing programming for execution by the at least one processor, the programming including instructions to:
select a TDD frame configuration from a set of available TDD frame configurations;
send an indicator of the TDD frame configuration to a plurality of devices;
determine a D2D discovery configuration for a discovery time interval according to the TDD frame configuration; and
send, to the plurality of devices, the D2D discovery configuration,
wherein the D2D discovery configuration includes parameters relating to resources of D2D discovery signals and transmission of the D2D discovery signals during the discovery time interval, the D2D discovery configuration comprising an initial discovery configuration radio frame and a spacing index for locating subsequent discovery configuration radio frames, wherein the D2D discovery configuration indicates, to each of the plurality of devices, successive D2D discovery subframe indices in the discovery time interval according to:

$$j=(r+ki) \bmod 1024,$$

wherein j is a D2D discovery subframe index in the discovery time interval, r is the initial discovery configuration radio frame, i is the spacing index, and k is an integer offset, the integer offset being 1 for an initial D2D discovery subframe index and increasing by 1 for each one of the successive D2D discovery subframe indices.

25. The network component of claim 24, wherein the discovery time interval corresponds to defined symbols in a designated subframe or multiple subframes of the set of available TDD frame configurations.

26. The network component of claim 25, wherein, according to the D2D discovery configuration, the transmissions of the D2D discovery signals are on uplink bandwidth.

27. The network component of claim 25, wherein, according to the D2D discovery configuration, the transmissions of the D2D discovery signals are on downlink bandwidth.

28. The network component of claim 27, wherein the designated subframe is a Multicast-Broadcast Single Frequency Network (MBSFN) subframe.

29. The network component of claim 25, wherein the designated subframe is a special subframe comprising an uplink bandwidth portion and a downlink bandwidth portion, and wherein, according to the D2D discovery configuration, the transmissions of the D2D discovery signals are only on the uplink bandwidth portion or only on the downlink bandwidth portion.

30. The network component of claim 24, wherein the network component is a base station.

31. A user device configured for device-to-device (D2D) and time division duplexing (TDD) communications, the user device comprising:
at least one processor; and
a non-transitory computer readable storage medium coupled to the at least one processor storing programming for execution by the at least one processor, the programming including instructions to:
receive an indicator of a TDD frame configuration selected from a set of available TDD frame configurations;
receive a D2D discovery configuration for a discovery time interval in accordance with the TDD frame configuration, the D2D discovery configuration comprising an initial discovery configuration radio frame and a spacing index for locating subsequent discovery configuration radio frames, wherein the D2D discovery configuration indicates, to the user device, successive D2D discovery subframe indices in the discovery time interval according to:

$j=(r+ki) \bmod 1024,$ wherein j is a D2D discovery subframe index in the discovery time interval, r is the initial discovery configuration radio frame, i is the spacing index, and k is an integer offset, the integer offset being 1 for an initial D2D discovery subframe index and increasing by 1 for each one of the successive D2D discovery subframe indices;
    allocate a transmissions resource to a D2D discovery signal within the D2D discovery subframe indices in the discovery time interval according to the D2D discovery configuration;
    transmit the D2D discovery signal during the discovery time interval; and
    receive, from another user device, a second D2D discovery signal during the discovery time interval according to the TDD configuration and the D2D discovery configuration.

32. The user device of claim 31, wherein the discovery time interval corresponds to allocated symbols in a designated subframe of multiple subframes of the set of available TDD frame configurations, and wherein the instructions to transmit the D2D discovery signal include instructions to transmit the D2D discovery signal only using the allocated symbols on the designated subframe.

\* \* \* \* \*